(12) United States Patent
Wilks et al.

(10) Patent No.: US 6,742,401 B2
(45) Date of Patent: Jun. 1, 2004

(54) DEVICE FOR MEASURING TORQUE AND THE DIRECTION OF ROTATION IN A DRIVE ASSEMBLY

(75) Inventors: Eberhard Wilks, Daufenbach (DE); Holger Jung, Aldenhoven (DE)

(73) Assignee: GKN Walterscheid GmbH (DE)

(*) Notice: Subject to any disclaimer, the term of this patent is extended or adjusted under 35 U.S.C. 154(b) by 0 days.

(21) Appl. No.: 10/288,070

(22) Filed: Nov. 5, 2002

(65) Prior Publication Data

US 2003/0089181 A1 May 15, 2003

(30) Foreign Application Priority Data

Nov. 9, 2001 (DE) .......................... 101 54 737

(51) Int. Cl.<sup>7</sup> .............. G01L 3/00; G01L 3/02
(52) U.S. Cl. ................ 73/862.08; 73/862.191
(58) Field of Search .......... 73/862.191, 862.08, 73/862.27, 862.192, 862.193

(56) References Cited

U.S. PATENT DOCUMENTS

| | | | |
|---|---|---|---|
| 4,485,682 A | * 12/1984 | Stroezel et al. | ........ 73/862.331 |
| 4,488,443 A | 12/1984 | Parkinson | |
| 4,602,515 A | 7/1986 | Eichenlaub | |
| 4,672,855 A | 6/1987 | Schmieder | |
| 4,683,746 A | 8/1987 | Cullingford et al. | |
| 5,228,349 A | 7/1993 | Gee et al. | |
| 6,085,600 A | 7/2000 | Herve | |
| 6,323,643 B1 | * 11/2001 | Kordecki | ............ 324/207.2 |

FOREIGN PATENT DOCUMENTS

| | | |
|---|---|---|
| DE | 24 35 286 | 2/1975 |
| DE | 36 27 739 C2 | 1/1989 |
| DE | 42 31 412 A1 | 3/1994 |
| DE | 100 52 069 A1 | 5/2002 |
| EP | 1 199 550 A2 | 8/2001 |
| JP | 06066652 | 11/1994 |

* cited by examiner

*Primary Examiner*—Edward Lefkowitz
*Assistant Examiner*—Lilybett Martir
(74) *Attorney, Agent, or Firm*—Harness, Dickey & Pierce P.L.C.

(57) ABSTRACT

A device for measuring torque and the direction of rotation in a drive assembly, has a torsion element (9) which can be torque-loaded and rotatingly driven for the purpose of transmitting torque around an axis of rotation (8). A first transmitter element (16) attached in a rotationally fast way to the torsion element (9). The first transmitter element (16) is moved on a first rotational circle. A second transmitter element (34) is positioned at a reference distance from the first transmitter element 16. The second transmitter element (34) is connected in a rotationally fast way to the torsion element (9) and is moved on a second rotational circle. A sensor unit 35 is fixed and arranged at a distance from the axis of rotation (8). The sensor unit (35) senses the passage of the transmitter elements 16, 34 or of a reference edge or a reference surface and generates a corresponding sequence of signals. The transmitter elements generate signals of different lengths and, within the relevant measuring range, signal intervals of different lengths between the signals. An evaluation unit (36) receives the signals. The evaluation unit (36) determines the torque applied and the direction of rotation from the distance in terms of time between the signals.

3 Claims, 2 Drawing Sheets

DEVICE FOR MEASURING TORQUE AND THE DIRECTION OF ROTATION IN A DRIVE ASSEMBLY

CROSS-REFERENCE TO RELATED APPLICATIONS

This application claims priority to German Patent Application No. 10154737.4 filed Nov. 9, 2001, which application is herein expressly incorporated by reference.

FIELD OF THE INVENTION

The invention relates to a device for measuring torque and direction of rotation in a drive assembly.

BACKGROUND OF THE INVENTION

In order to measure torque at a rotating component, for instance at a torque-loaded driveshaft in a drive, the component is preferably provided with strain gauges. The generated electric signals are transmitted to the outside by slip ring transmitters. It is possible, in such devices, to generate high-precision torque signals which are required for laboratory measuring devices. Also, signal transmission can be effected in a contact-free way, by senders and receivers. The bridges for the strain gauges, calibrating the same and providing the electrical connections generate high costs. A significant cost factor is in the transmission of signals from the rotating shaft to the stationary components. Due to the high degree of integration of the electronic components in drives, transmission of signals suffers from a high inherent error rate. For many devices and machines, such a high degree of accuracy in this type of measuring device is not required. However, the above-mentioned devices cannot be redefined to such an extent that adequate cost levels are achieved. This is the reason why, in spite of the high degree of benefit of torque measurements for operational processes, such devices are practically never used in the drive systems of agricultural machinery. One example for integrating such a device in a drive is described in DE 42 31 412 C1.

U.S. Pat. No. 4,488,443 shows a device that measures torque at a shaft with a first transmitter disc and a second transmitter disc. The first transmitter disc is connected, in a rotationally fast way, to the shaft. The second transmitter disc is connected, in a rotationally fast way, to a tube which is co-axially arranged relative to the shaft. The tube, at a first longitudinal end that is arranged at a distance from the first transmitter disc, is connected to the shaft in a rotationally fast way. The second end of the tube is slidingly supported on the shaft. The second end of the tube is arranged to adjoin the first transmitter disc. The second transmitter disc is secured to the second end of the tube. The first transmitter disc and the second transmitter disc each have teeth, which start from an end face, that project towards the respective other transmitter disc. The teeth of the first transmitter disc and the second transmitter disc are alternatingly distributed across the circumference and are arranged at a distance from one another. A sensor is stationarily fixed relative to the shaft. The sensor records the passage of the teeth when the shaft rotates. If the torque load is high, the shaft becomes twisted so that the first transmitter disc is rotated relative to the second transmitter disc. The distances changes between the teeth of the first transmitter disc and the teeth of the second transmitter disc. The distances between the teeth as recorded by the sensor enables conclusions regarding the applied torque. However, the disadvantage is that it is not possible to determine the direction of rotation of the shaft nor the direction of the torque.

SUMMARY OF THE INVENTION

It is the object of the invention to provide a device which is suitable to determine torque and the direction of rotation of the drive assembly.

In accordance with the invention, a device to measure torque and the direction of rotation in a drive assembly has a torsion element that can be torque-loaded and rotatingly driven to transmit torque around an axis of rotation. The torsion element is in the form of a torsion shaft with a first shaft end and a second shaft end. A first transmitter element, which is journal-shaped is attached in a rotationally fast way to the torsion element transversely to the axis of rotation. When the torsion element rotates, the first transmitter element is moved on a first rotational circle. A reference element, in the form of a tube with a first tube end and a second tube end, is co-axially arranged around the torsion element. The first tube end is firmly connected to the first shaft end. A second transmitter element forms part of the reference element. The second transmittal element is arranged at the outer circumference of the second tube end of the reference element. The second transmitter element is at a reference distance from the first transmitter element. The second transmitter element is connected in a rotationally fast way to the torsion element. When the torsion element rotates, the second transmitter element is moved on a second rotational circle. The first rotational circle is located on the second rotational circle. A sensor unit is fixed and arranged at a distance from the axis of rotation. The sensor senses the passage of the transmitter element, of a reference edge or of a reference surface and generates a corresponding sequence of signals. The transmitter elements generate signals of different lengths. Also, the transmitter elements in the relevant measuring range, generate signal pauses of different lengths between the signals. An evaluation unit receives the signals. The evaluation unit determines the applied torque and the direction of rotation, from the time interval and the sequence in terms of time of the signals and signal pauses of different lengths. The second tube end of the reference element has a recess which enables the passage of the first transmitter element attached to the torsion element. Both transmitter elements are circumferentially offset in one plane on their common rotational circles. A first recess is provided at the second tube end of the reference element. A second recess is provided diametrically to the first recess. The first transmitter element, via a first projection, extends radially into the first recess and, via a second projection, the first transmitter element projects radially out of the second recess. The projecting portion of first transmitter element serves as a transmitter portion. If a predetermined maximum torque is exceeded, the reference element participates in the transmission of torque.

The degree of twisting of the torsion element varies as a function of the applied torque. As a result, the first transmitter element is rotated relative to the second transmitter element. Thus, as a function of the prevailing torque, signal intervals of different lengths occur between the signals. The length of the signal intervals enables conclusions regarding the angle of torsion and the applied torque.

Also, conclusions can be drawn regarding the direction of rotation of the torsion element. Since the transmitter elements are designed so that they generate signals of different lengths and, in the relevant measuring range, signal intervals of different lengths between the signals. For example, the first transmitter element can be longer in the circumferential direction than the second transmitter element. Further, if viewed in the circumferential direction, the distance between the first transmitter element and the second transmitter element can be smaller than the distance between the second transmitter element and the first transmitter element. Therefore, in the case of a rotation in a first direction, the long signal of the first transmitter element can be followed by a long signal interval. In such a case, in the other direction of rotation, the long signal interval would be followed by a long signal. The sequence enables the direction of rotation to be determined. Once the direction of rotation has been determined, it is also possible to determine the direction of torque.

Because the second transmitter element forms part of a reference element and because the first rotational circle is located on the second rotational circle, the passage of the transmitter elements of a reference edge or of a reference surface of the transmitter elements can be identified by only one sensor.

The second transmitter element can be provided in the form of a journal element. The second transmitter element is arranged on the outer face of the reference element and is circumferentially offset relative to the second recess from which the second projection emerges.

The journal element, that serves as the second transmitter element, is longer in the circumferential direction than the second projection which serves as the first transmitter element.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

A preferred embodiment of the invention will be explained in greater detail with reference to a drive assembly for an agricultural implement.

DETAILED DESCRIPTION OF THE PREFERRED EMBODIMENTS

The following description of the preferred embodiment(s) is merely exemplary in nature and is in no way intended to limit the invention, its application, or uses.

Figure 1:
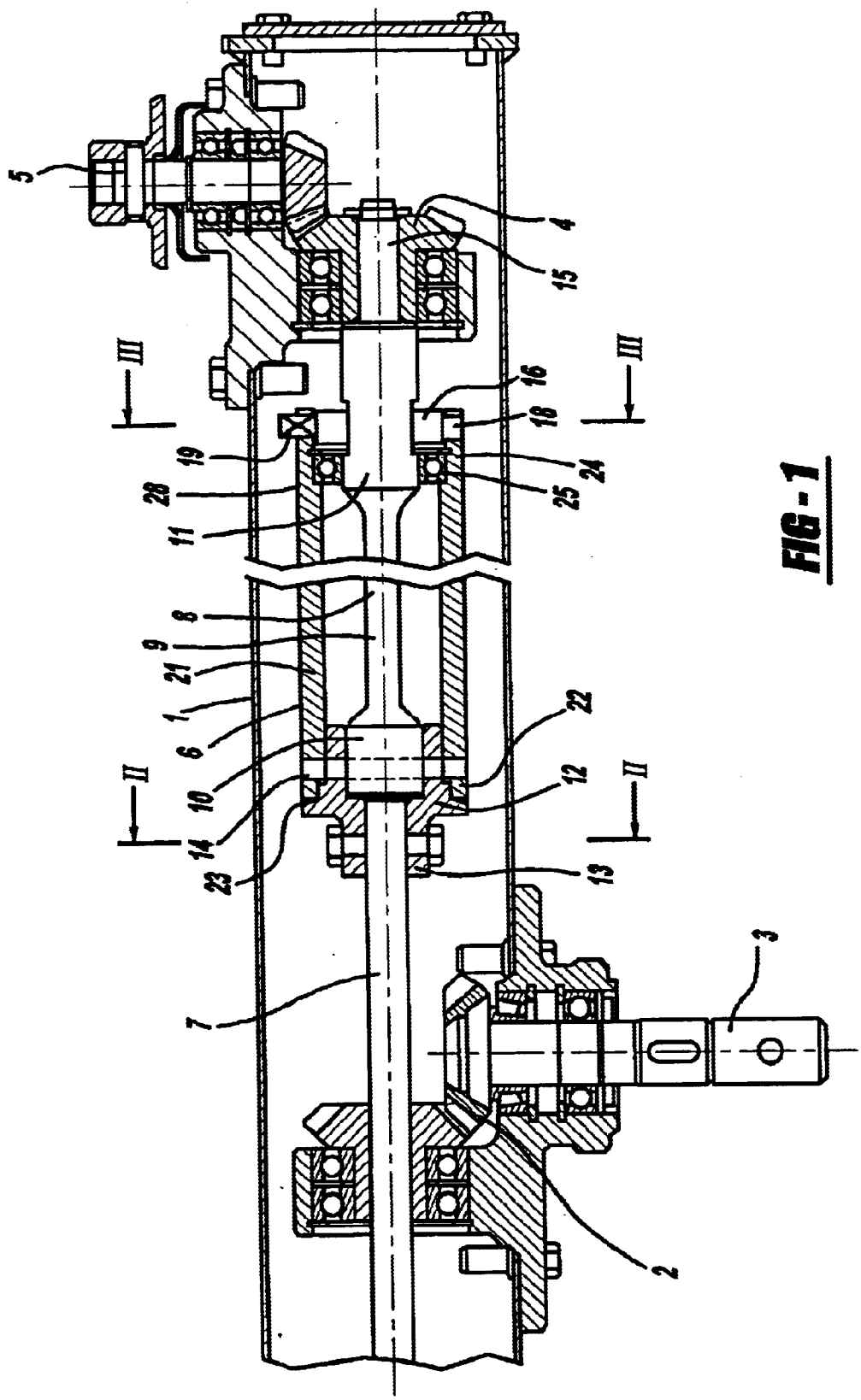
FIG. 1 is a longitudinal section view through a drive assembly portion including a torque measuring device in accordance with the invention.
Figure 3:
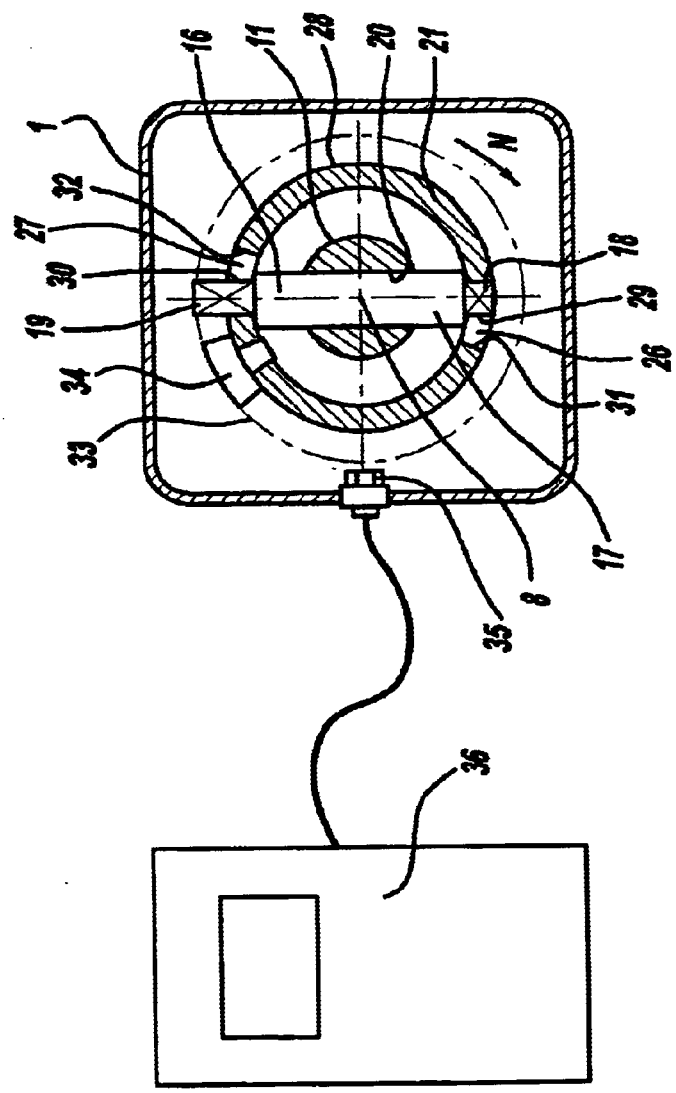
FIG. 3 is a section view along line III—III according to FIG. 1, showing an associated evaluation unit.
Figure 2:
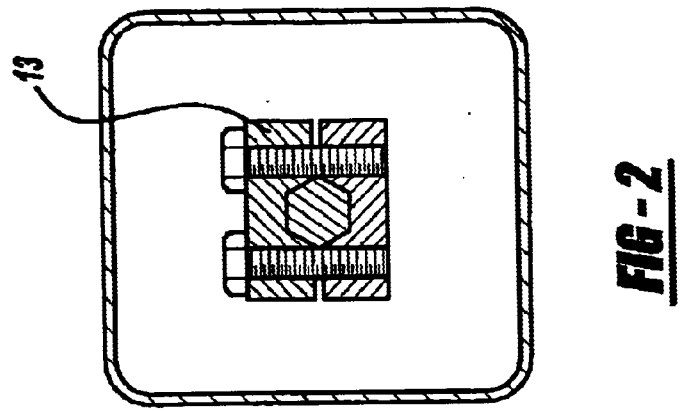
FIG. 2 is a section view along line II—II according to FIG. 1.

FIGS. 1 to 3 will be described jointly below.

The Figures show a portion of a drive assembly for an agricultural implement. A housing 1 or a box-shaped carrier frame is associated with a first bevel gear angle drive 2. An outwardly projecting driving journal 3 serves to introduce torque. The first bevel gear angle drive 2 is rotationally connected to a second bevel gear angle drive 4 via the torque measuring device 6 and a driveshaft 7 which, together, can be rotated around the axis of rotation 8. The second bevel gear angle drive 4, at a distance therefrom, is associated with the housing 1 and an output journal 5. A torque introduced via the driving journal 3 is passed on via the assembly to the output journal 5. The driveshaft 7 also serves to establish a torque connection with one or several further bevel angle drives with corresponding output journals. One or more torque measuring devices, designed in accordance with the torque measuring device 6 described below, can be incorporated into the driveline leading to the further portions to be driven.

The torque measuring device 6 includes a torsion element 9. The torsion element 9 is a shaft with a cross-section which is designed for the torque range required for the standard operating range. The torsion element 9 includes a first shaft end 10 and a second shaft end 11. The shaft ends 10, 11 are thickened relative to the in-between region which is twisted when subjected to torque. The first shaft end 10 is connected, via a cylindrical pin 14, to the attaching element 12. The attaching element 12 has a clamping portion 13 which provides a connection with the driveshaft 7. The first shaft end 10 is rotationally connected to the driveshaft 7 so that when driveshaft 7 rotates, the first shaft end 10 rotates within the driveshaft 2. The second shaft end 11 is provided with a connecting journal 15. The connecting journal provides a rotationally fast connection with the bevel gear of the second bevel gear angle drive 4. Further, the second shaft end 11 includes a transverse bore 20. The bore axis intersects the axis of rotation 8 at a right angle. A first transmitter element 16, in the shape of a journal with its cylindrical connecting portion 17, is inserted into the transverse bore 20. The first transmitter element 16 has a first projection 18 and, diametrically relative thereto, a second projection 19 at the other end.

A tubular reference element 21 is arranged around the torsion element 9. The reference element 21 has a first tube end 22 at a distance from the first transmitter element 16. The first tube end 22 is firmly connected to the attaching element 12 by a weld 23. The reference element 21 is also firmly connected to the first shaft end 10 of the torsion element 9, so that it follows the rotational movement of the torsion element. The tubular reference element 21 is supported by a roller bearing 25 on the second shaft end 11 in the region of its second tube end 24. The second tube end 24 thus follows the first tube end 22. The second tube end is not subjected to any deformation in the measured region. Accordingly, as a function of the torque applied to the torsion element 9, a reference point at the second shaft end 11, depending on the direction of rotation, either precedes or follows a reference point arranged on the first shaft end 10 in the torque-free condition.

The second tube end 24 includes two diametrically arranged recesses, the first recess 26 and the second recess 27. These recesses 26 and 27 extend in the circumferential direction of the tube across a delimited region. The two recesses 26, 27 are identical. The first projection 18 extends as far as the inside of the first recess 26. Towards the outside of the tube, the projection 18, is flush with the outer face 28 of the tubular reference element 21. The second projection 19 passes through the second recess 27. The second projection 18 projects, by a certain dimension, from the outer face 28 of the tubular reference element 21. The circumferential extension of the two recesses 26, 27 exceeds that of the two projections 18, 19 by a certain dimension.

When the torsion element 9 is torque-loaded, the two projections 18, 19, within the limits of their degree of freedom, are able to move freely in the recesses 26, 27. When a predetermined maximum torque is reached, the two projections 18, 19, via their flattened portions 29, 30, come to rest against the corresponding top faces 31, 32. Thereafter, the reference element 21, participates in the transmission of torque from the first bevel gear angle drive 2 to the second bevel gear angle drive 4.

A portion of the second projection 19 that projects beyond the outer face 28 of the tubular element 21 serves as a transmitter. The portion beyond the outer face 28 of the tubular reference element 21 practically assumes the function of the transmitter element. During rotation, the portion is centered on the rotational circle 33.

A second transmitter element 34 projects from the outer face 28 of the tubular reference element 21. The second transmitter element 34 is circumferentially offset relative to the second recess 27. When viewed in the circumferential direction, the second recess 27 is longer than the second projection 19. Also, the second recess 27 is longer than the portion of the second projection 34 that acts as a transmitter portion. The second transmitter element 34 is arranged on the same rotational circle as the second projection 19.

The first transmitter element 16 and the second transmitter element 34 enclose an angle which is smaller than 180°. This ensures that, in the case of a rotation, the two transmitter elements generate signals which follow one another at short intervals and are followed by a long signal interval. If torque is applied in the direction of rotation N, the second projection 19 of the transmitter element 16 moves ahead of the second transmitter element 34. The dimension of such a lead is recorded by a sensor 35.

The sensor 35 is arranged opposite the rotational circle 33 and thus opposite the two transmitter elements 16, 34. The sensor element 35 is connected to an evaluation unit 36. The evacuation unit 36 calculates the applied torque on the basis of the offset, in terms of time, of the passage of the first transmitter element 16 advancing in the direction of rotation N relative to the second transmitter element 34. The applied torque is proportional to the distance between the two transmitter elements 16, 34 or the second projection 19 of the first transmitter element 16 and the second transmitter element 34.

The evaluation unit 36 can generate an acoustic signal or a switching sequences, to stop the drive. The signal can also be used to indicate the applied torque or generate an acoustic warning. The use of the device in accordance with the invention is not restricted to the above-described drive assembly. Apart from being used in drives for agricultural implements and machinery, the inventive device can be used in drivelines generally, also for example in that of a bicycle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for measuring torque and the direction of rotation in a drive assembly, comprising: a torsion element, said torsion element may be torque-loaded and rotatingly driven for transmitting torque around an axis of rotation, said torsion element being a torsion shaft with a first shaft end and a second shaft end; a first transmitter element being journal-shaped and attached in a rotationally fast way to the torsion element transverse to the axis of rotation, when the torsion element rotates, said first transmitter element being moved on a first rotational circle; a tubular reference element with a first tube end and a second tube end, said tubular reference element being co-axially arranged around the torsion element, said first tube end of said tubular reference element being firmly connected to the first shaft end; a second transmitter element forming part of the reference element, said second transmitter element being arranged at the outer circumference of the second tube end of the tubular reference element, said second transmitter element being positioned at a desired reference distance from the first transmitter element and connected in a rotationally fast way to the torsion element and when the torsion element rotates, said second transmitter element being moved on a second rotational circle, with the first rotational circle being located on the second rotational circle', a sensor unit being fixed and arranged at a distance from the axis of rotation, said sensor senses the passage of the transmitter elements, of a reference edge or of a reference surface, said sensor generates a corresponding sequence of signals, said transmitter elements generating signals of different lengths and, within a relevant measuring range, signal intervals of different lengths between the signals', an evaluation unit receives the signals, said evaluation unit determining the applied torque and direction of rotation from the time interval and the sequence in terms of time of the signals and signal intervals of different lengths', said second tube end of the reference element including a recess to enable the passage of the first transmitter element, attached to the torsion element, both transmitter elements being arranged in a circumferentially offset way in one plane on their common rotational circles', a first recess on the second tube end of the reference element, positioned diametrically opposite to a second recess, said first transmitter element, via a first projection, extending radially into the first recess and, via a second projection, said first transmitter elements projecting radially out of the second recess, said second projection including a projecting portion serving as a transmitter portion; and a predetermined maximum torque exceeded, the reference element participates in the transmission of torque.

2. A device according to claim 1, wherein the second transmitter element being a journal element arranged on the outer face of the reference element and being circumferentially offset relative to the second recess from which the second projection emerges.

3. A device according to claim 2, wherein the journal element, serving as the second transmitter element, is longer in the circumferential direction than the second projection, serving as the first transmitter element.

* * * * *

UNITED STATES PATENT AND TRADEMARK OFFICE
CERTIFICATE OF CORRECTION

PATENT NO. : 6,742,401 B2
DATED : June 1, 2004
INVENTOR(S) : Eberhard Wilks et al.

It is certified that error appears in the above-identified patent and that said Letters Patent is hereby corrected as shown below:

Column 6,
Lines 19, 26, 30 and 34, "," should be -- ; --

Signed and Sealed this

Seventh Day of December, 2004

JON W. DUDAS
*Director of the United States Patent and Trademark Office*